United States Patent Office 2,933,500
Patented Apr. 19, 1960

2,933,500

N-AMINOINDOLOBENZOQUINOLIZINIUM COMPOUNDS

Bernard Rudner, Pittsburgh, Pa., assignor to W. R. Grace & Co., New York, N.Y., a corporation of Connecticut No Drawing. Application November 20, 1958
Serial No. 775,116

12 Claims. (Cl. 260—287)

This invention relates to bridgehead nitrogen compounds. In one specific aspect, it relates to derivatives of indolobenzoquinolizine alkaloids which may be called N-aminoindolobenzoquinolizinium compounds. This application is a continuation-in-part of my co-pending application Serial No. 547,831, filed November 18, 1955, now U.S. Patent No. 2,891,060.

A bridgehead nitrogen compound is an organic compound, the molecular structure of which contains at least two mutually fused rings sharing a common nitrogen atom (the bridgehead nitrogen) and at least one other atom. The yohimbane alkaloids contain such a structure. It has been discovered that N-aminoindolobenzoquinolizinium compounds exhibit remarkable hypotensive properties as well as possessing other desirable attributes.

It is, therefore, an object of the present invention to provide a new class of pharmacologically useful compounds.

The compounds of my invention are suitably prepared by the action of chloramine on the appropriate bridgehead nitrogen compound. In the preferred practice of my invention, the reactant amine dissolved in an unreactive solvent is exposed to a stream of gaseous chloramine. The resultant N-aminoindolobenzoquinolizinium chloride is isolated by conventional laboratory techniques. Compounds containing anions other than chloride are prepared by metathesis, starting with the chloride and a compound containing the anion to be introduced.

In accordance with the present invention, I have made available a new class of compounds having the general formula:

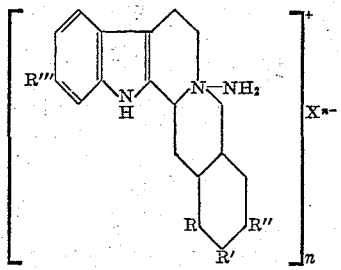

In the above formula, R is a member selected from the group consisting of hydrogen, carboxy and carbolower-alkoxy. R' and R''' are independently selected from the group consisting of hydrogen, hydroxyl and lower alkoxy. R'' is a member selected from the group consisting of hydroxy, benzoyloxy, cinnamoyloxy and the nuclear substituted lower alkoxy derivatives of the latter two. X is an anion bearing the charge $n$; $n$ also represents the number of cations required to balance the anionic charge.

When my compounds are used for pharmaceutical purposes, X must be a pharmaceutically acceptable anion. The primary attributes of such an anion are nontoxicity and pharmaceutical compatibility. Otherwise, the choice of the anion is of little consequence, since the primary activity of my novel compounds resides in the cation. The salts obtained by variation of the anion may in some cases have special advantages due to solubility, ease of crystallization, lack of objectionable taste and the like, but these considerations are all subsidiary to the characteristics of the cation which are independent of the character of the anion. Hence all variations of X are considered equivalent for the purpose of the present invention. Specific, but non-limiting, variants of X are as follows: chloride, bromide, iodide, sulfate, bisulfate, acetate, salicylate, valerate, oleate, phenate, laurate, borate, benzoate, lactate, nitrate, diglycollate, phosphate, phenylethylbarbiturate, o-acetoxybenzoate, citrate, dialkylbarbiturate, sulfathiazole, theophyllinate, urate, maleate, fumarate, succinate, tartrate, diethylbarbiturate, penicillate, camphorate, salicylamide, diphenyldantoin, carbonate, cacodylate, aconitate, sulfamate, gentisate, malate and the like.

One method of preparing the novel compounds of my invention is to react chloramine with the tertiary amine corresponding to the desired hydrazinium compound; the product is isolated and purified by standard laboratory techniques. Since many of the amines are commercially available as their salts, the hydrochloride being the most common, it has been found convenient to treat aqueous solutions of the amine salts with base and extract the free amine with a solvent such as chloroform. After treatment of the extract with a conventional drying agent, the solution is ready for chlorination. While chloramine is most advantageously prepared as a gaseous chloramine-ammonia mixture obtained from a generator constructed according to the teachings of Sisler et al., U.S. Patent 2,710,248, other methods are equally adaptable for the purpose of the present invention. For instance, chloramine can be made by reacting chlorine with an excess of ammonia in carbon tetrachloride or similar halogenated hydrocarbon solvents under controlled conditions of mixing at low temperatures. Such a process is fully described in U.S. Patent 2,678,258 to John F. Haller. Another effective procedure is that of Coleman et al. fully described in Inorganic Syntheses, vol. 1, 59 (1939). Alternatively, the chloramine can be formed in the presence of the amine as described in the copending application Serial No. 605,230 filed August 20, 1956, which teaches the reaction of chlorine and a tertiary amine in the presence of excess ammonia. For simplicity, when both the amine and the product are soluble in the same inert solvent, e.g., chloroform, chloramine may be formed in situ by this method right in the solution containing the reactant tertiary amine. In general, the choice of solvent is one of economy and simplicity. When preformed chloramine is used and good adsorption is required for efficient reaction, it has been found desirable to bubble chloramine through a long column of a solution comprising the tertiary amine dissolved in relatively cheap inert solvent. By inert solvent it is meant a solvent unreactive under the condition of the reaction. Solvents which serve this purpose include hydrocarbons, e.g., heptane, cyclohexane, benzene, xylene and the like; ethers, e.g., diethyl ether, diamyl ether, dioxane and anisole; amides, e.g., dimethylformamide and dimethylacetamide; halohydrocarbons, e.g., chloroform, carbon tetrachloride, trichloroethylene and chlorobenzene; nitroaromatics, e.g., nitrobenzene. For special purposes, water and other hydroxylic solvents such as ethyl alcohol and Cellosolve may be used. When the reaction is conducted in anhydrous solution, the product often precipitates as the reaction progresses. In aqueous solution, however, it is usually necessary to concentrate or to evaporate to dryness in order to isolate the product.

Another method of preparing the novel compounds of my invention is the reaction of hydroxylamine-o-sulfonic acid with tertiary amines which produces the hydrazinium sulfate corresponding to the tertiary amine used. Preferably the appropriate tertiary amine and hydroxylamine-o-sulfonic acid are allowed to react or are heated together in the presence of an alcoholic solvent but excess amine or other suitable solvents may be used. Even though the use of a solvent is not required, superior results are obtained with a solvent because of the extremely exothermic reaction that quite often results. A frequent purification step is the treatment of the reaction mixture with a basic substance such as sodium carbonate to remove acidic constituents from the product hydrazinium sulfate which is essentially neutral and stable to the action of base. Further purification is effected by standard laboratory techniques.

It is obvious that not all of the novel hydrazinium compounds of my invention are capable of being prepared directly as shown above. In order to provide the other useful salts of the present invention, it is necessary to prepare the compounds containing anions other than chloride or sulfate by metathesis. Many of the anions described supra can be obtained by mixing aqueous solutions of the hydrazinium chloride with appropriate reagents. More often than not, the desired product precipitates directly as the reaction progresses. This is the case where the new salt being formed is less soluble or insoluble in water. Other metathetical approaches are available and the method selected depends on experimental convenience, costs of reagents and the differences in physical properties between the product and the starting material to be utilized in their separation. Reaction of a hydrazinium halide with a soluble silver salt, such as silver nitrate, results in the precipitation of silver halide and the formation of the hydrazinium nitrate. In an analogous manner, treatment of the sulfate with a soluble barium salt results in the precipitation of barium sulfate and conversion to the anion of the barium salt. Quite often the appropriate reactants are heated together in the absence of a solvent and the product isolated by standard laboratory techniques. Another approach independent of the formation of an insoluble solid, is to react the halide with an excess of the desired anion as its acid; hydrogen halide is evolved as the new salt is formed. When it is necessary to prepare a very soluble salt, the reaction of the hydrazinium hydroxide with equivalent amounts of the appropriate acid may be utilized; this approach is also used for the preparation of very pure compounds. (Subjecting a hydrazinium halide to the action of moist silver oxide will give the hydrazinium hydroxide.)

The bridgehead nitrogen yohimbane alkaloids suitable as starting materials for the preparation of my novel N-aminoindolobenzoquinolizinium compounds are mostly naturally occurring constituents of Rauwolfa plants or simple derivatives thereof. The parent yohimbane structure and its better known derivatives are illustrated below:

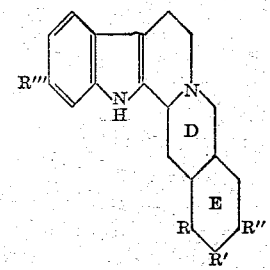

| Alkaloid | R | R' | R'' | R''' |
|---|---|---|---|---|
| (yohimbane) | H | H | H | H |
| alpha yohimbane | COOCH₃ | OH | H | H |
| corynanthine | COOCH₃ | OH | H | H |
| reserpine | COOCH₃ | OCH₃ | (CH₃O)C₆H₂COO | OCH₃ |
| rescinnamine | COOCH₃ | OCH₃ | (CH₃O)C₆H₂CH=CHCOO | OCH₃ |
| reserpic acid | COOH | OCH₃ | OH | OCH₃ |
| deserpidine | COOCH₃ | OCH₃ | (CH₃O)₃C₆H₂COO | H |

A superficial examination of the above table shows alpha yohimbine and corynanthine to be the same. A further examination of the structural formula, however, shows that the fusion of rings "D" and "E" may be either cis or trans and the possibility of further geometrical isomerism is present in the saturated decalin-type ring system formed by their fusion. In addition, several asymmetric carbon atoms are present and the geometrically permissible stereoisomers can occur. In the case of corynanthine, R and R', the carbomethoxy and the hydroxyl groups, are believed to be cis to each other; rings "D" and "E" are thought to be cis-fused in the reserpine family of compounds.

Much brilliant synthetic work has been done in the last few years to help ellucidate the finer points of structure present in Rauwolfa alkaloids but a considerable divergence of view is found regarding the absolute stereochemistry of reserpine, the most studied member, and the matter cannot yet be regarded as settled. It is, therefore, not the purpose of this brief discussion to establish the stereochemistry of each compound mentioned here but merely to mention these possibilities so that organic chemists skilled in the art may have a better understanding of the stereoisometric considerations involved. Nor is it the purpose of this discussion to limit the scope of my invention to any specific conformation.

The novel compounds of my invention possess very favorable therapeutic possibilities because of the exceptionally wide range between the pharmacologically effective dose and those doses which may be harmful or toxic. My compounds possess the desirable attribute of lowering blood pressure without impairing respiration. In addition, these beneficial hypotensive effects have a prolonged duration. These N-aminoindolobenzoquinolizinium compounds display other favorable physiological effects as will be seen below.

The scope and utility of my invention is further illustrated by the following examples:

*Example I*

Chloramine, prepared by means of the Sisler et al. generator discussed above, was passed into a solution of 30 g. of reserpine in 800 ml. of chloroform. The 54.5 g. precipitate, containing N-aminoreserpinium chloride and ammonium chloride was collected by filtration and washed successively with boiling chloroform, acetone and water. After vacuum drying at 60° C., the product was a water and alcohol insoluble white powder melting above 260° C. somewhat soluble in acetic acid and propylene glycol. Calculated for $C_{33}H_{42}N_3O_9Cl$: 60% C, 6.41% H and 6.37% N, found: 59.9% C, 6.58% H and 6.59% N.

Example II

Two parts of N-aminoreserpinium chloride from Example I and one part of 5,5-diethylbarbituric acid were heated together at 95–110° C. for two hours. After the melt had cooled, it was washed well with acetone to remove unreacted barbital and then with water. The product was recrystallized from dimethylformamide; N-aminoreserpinium 5,5-diethylbarbiturate, having the structural formula shown below, decomposed ca. 213° C. with some sublimation.

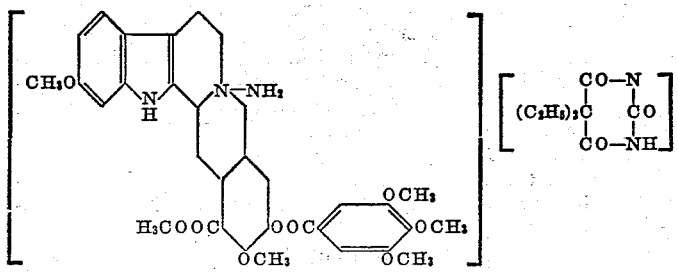

Example III

A solution containing 100 mg. of N-aminoreserpinium chloride from Example I, 25 ml. of propylene glycol, about 1 g. of water and 0.1 g. of sodium hydroxide was held at 60° C. for 30 minutes. The cooled reaction mixture was brought to a pH of 3 by the addition of N hydrochloric acid and the resultant solid collected by filtration and washed well with more dilute acid. On drying, there was found the chloramine adduct of reserpic acid, melting ca. 221° C. with decomposition; its structural formula is given below. Attempts to prepare the zwitterion by treating the product with inorganic bases and alkalis failed.

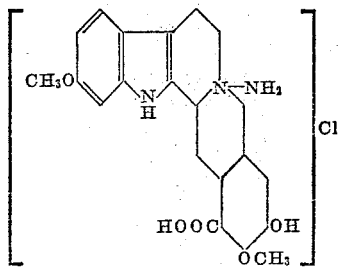

Example IV

Fifty mg. of the product of Example III and an equal weight of bonzoyl chloride were placed in a stoppered flask containing 10 ml. of pyridine and allowed to stand for two days with intermittent vigorous shaking. The reaction mixture was poured into 60 ml. of a 2% aqueous sodium carbonate solution and allowed to sit overnight at ca. 5° C. before being filtered. After being washed well with water and dried, the product was recrystallized from nitromethane. The chloride-free solid melted 191–193° C. with decomposition and is believed to be the benzoate of N-aminobenzoylreserpic acid having the structure

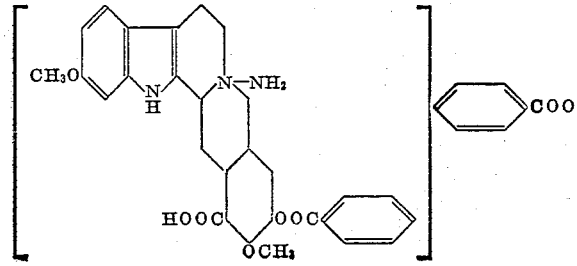

Example V

A solution containing 1.0 g. of yohimbine hydrochloride and 0.4 g. of sodium methoxide in 50 ml. of methyl alcohol was kept at reflux while 0.5 g. of hydroxylamine-o-sulfonic acid dissolved in 25 ml. of the same solvent was added in small portions. After the addition had been completed, the reaction mixture was refluxed for two hours and the cooled reaction mixture poured into 50 ml. of 5% acetic acid. N-aminoyohimbinium sulfate was collected by filtration, washed well with cold water and dried; it decomposed about 260° C. and has the structure

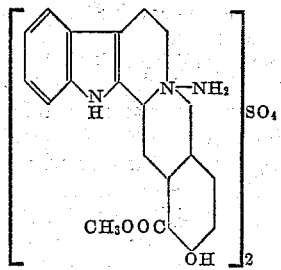

Example VI

About 100 mg. of N-aminoyohimbinium sulfate dissolved in 50 ml. of boiling isopropyl alcohol was treated with the equivalent amount of barium chloride suspended in 50 ml. of the same solvent. The reaction mixture was refluxed for two hours and filtered hot. On cooling N-aminoyohimbinium chloride (melting and decomposing ca. 231° C.) crystallized from the filtrate.

Example VII

The general procedure of Example V was repeated with corynanthine hydrochloride in place of its stereoisomer yohimbine hydrochloride. N-aminocorynanthinium sulfate was a white solid melting and decomposing around 258–260° C. It was more stable to light than the starting amine.

Example VIII

Using the chloramine generator of Example I, chloramine gas was passed into a solution of 100 mg. of rescinnamine in chloroform. The resultant precipitate was collected by filtration and washed free of ammonium chloride with cold water. When dry, the product N-aminorescinnaminium chloride melted ca. 218° C., it has the following structural formula

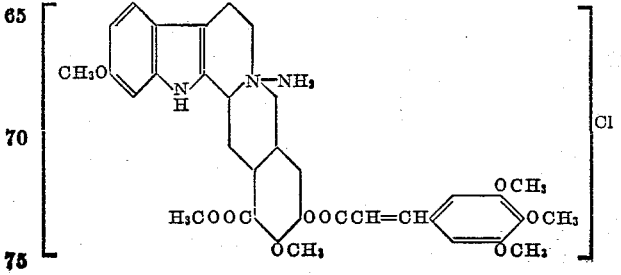

Example IX

N-aminoreserpinium chloride was suspended in physiological saline or 0.5% methyl Cellosolve at concentrations of 10 and 50 mg./kg., respectively, and administered to unstarved male albino mice at doses of 100, 300 and 1000 mg./kg. There were no signs observed other than slight depression following injection of doses containing 100 to 1000 mg./kg. No deaths occurred and all animals appeared normal at 24 and 48 hours. The acute intraperitoneal $LD_{50}$ at 48 hours appears to be greater than 1000 mg./kg.

Example X

A one percent solution of N-aminoreserpinium chloride was prepared by dissolving the material in glacial acetic acid and diluting with equal parts of propylene glycol. For purposes of injection, the solution was diluted with physiological saline. A female dog weighing 6.2 kg. received intravenous doses of 0.1, 0.5 and 2.5 mg./kg. over a period of approximately five and one-half hours. Doses of 0.1 and 0.5 mg./kg. caused marked falls in blood pressure lasting from 5 to 20 minutes with transient slight respiratory stimulation. The 2.5 mg./kg. injection caused a slight rise in blood pressure followed by a marked fall; the blood pressure did not return to preinjection levels within one hour. The pressor responses to epinephrine and nor-epinephrine were markedly antagonized after the 0.1 mg./kg. dose, but never completely abolished. The depressor response to acetylcholine was not significantly affected during the study. The depressor response to nicotine appeared to be completely abolished after the 0.1 mg./kg. dose and the depressor response to histamine was markedly prolonged. The carotid sinus pressor reflex was completely abolished after the second 0.1 mg./kg. dose.

To summarize, relatively low doses of the test compound exhibit a marked depressant action on the blood pressure with little effect on respiration. The compound apparently possesses both adrenalytic and ganglionic depressant properties and appears to prolong the response to histamine.

I claim:
1. Compounds having the general formula:

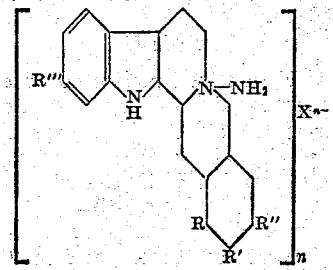

wherein R is a member selected from the group consisting of hydrogen, carboxy and carboloweralkoxy; R' and R''' are independently selected from the group consisting of hydrogen, hydroxyl and lower alkoxy; R'' is a member selected from the group consisting of hydroxy, benzoyloxy, cinnamoyloxy, lower alkoxy benzoyloxy and lower alkoxy cinnamoyloxy; and X is a pharmaceutically acceptable anion bearing the charge $n$.

2. Compounds according to claim 1 wherein R is carboloweralkoxy, R' is lower alkoxy, R'' is trimethoxybenzoyloxy and R''' is lower alkoxy.

3. Compounds according to claim 1 wherein R is carboxy, R' is lower alkoxy, R'' is hydroxy and R''' is lower alkoxy.

4. Compounds according to claim 1 wherein R is carboloweralkoxy, R' is hydroxy and R'' and R''' are hydrogen.

5. Compounds according to claim 1 wherein R is carboloweralkoxy, R' is lower alkoxy, R'' is trimethoxycinnamoyloxy and R''' is lower alkoxy.

6. Compounds according to claim 1 wherein R is carboxy, R' is lower alkoxy, R'' is benzoyloxy and R''' is lower alkoxy.

7. N-aminoreserpinium chloride.
8. N-aminoyohimbinium sulfate.
9. N-aminocorynanthinium sulfate.
10. N-aminorescinnaminium chloride.
11. The benzoate of N-aminobenzoylreserpic acid.
12. The chloride of N-aminoreserpic acid.

No references cited.

UNITED STATES PATENT OFFICE
CERTIFICATE OF CORRECTION

Patent No. 2,933,500            April 19, 1960

Bernard Rudner

It is hereby certified that error appears in the printed specification of the above numbered patent requiring correction and that the said Letters Patent should read as corrected below.

Column 8, lines 3 to 13, the structural formula should appear as shown below instead of as in the patent:

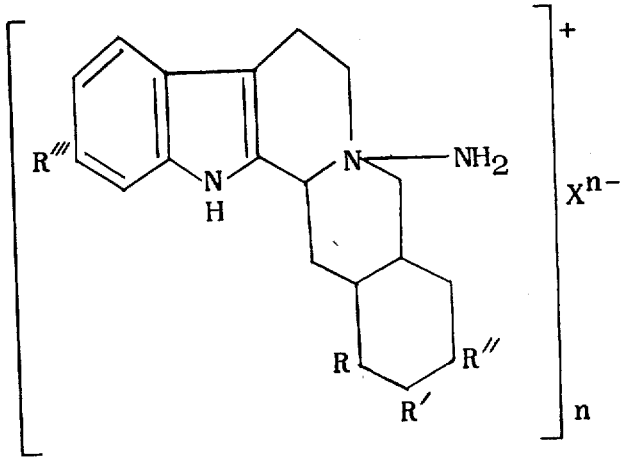

Signed and sealed this 6th day of December 1960.

(SEAL)
Attest:
KARL H. AXLINE
Attesting Officer

ROBERT C. WATSON
Commissioner of Patents